United States Patent
Ojala et al.

(10) Patent No.: US 9,088,902 B2
(45) Date of Patent: Jul. 21, 2015

(54) USER EQUIPMENT CARRIER ACTIVATION

(75) Inventors: Jussi K. Ojala, Helsinki (FI); Jarkko T. Koskela, Oulu (FI); Lars Dalsgaard, Oulu (FI); Tero Henttonen, Espoo (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 302 days.

(21) Appl. No.: 13/642,395

(22) PCT Filed: Apr. 13, 2011

(86) PCT No.: PCT/FI2011/050319
§ 371 (c)(1),
(2), (4) Date: Feb. 4, 2013

(87) PCT Pub. No.: WO2011/135163
PCT Pub. Date: Nov. 3, 2011

(65) Prior Publication Data
US 2013/0136015 A1    May 30, 2013

Related U.S. Application Data

(60) Provisional application No. 61/329,685, filed on Apr. 30, 2010.

(51) Int. Cl.
*H04W 24/02* (2009.01)
*H04W 72/04* (2009.01)
(Continued)

(52) U.S. Cl.
CPC .............. *H04W 24/02* (2013.01); *H04L 5/001* (2013.01); *H04L 5/0053* (2013.01); *H04L 5/0098* (2013.01); *H04W 72/0453* (2013.01);
(Continued)

(58) Field of Classification Search
CPC ............ H04W 72/0453; H04W 74/00; H04W 74/002
USPC .......................... 370/252, 254–255, 328, 338
See application file for complete search history.

(56) References Cited

U.S. PATENT DOCUMENTS 8,385,832 B2 * 2/2013 Johansson et al. ............ 455/63.1
8,553,712 B2 * 10/2013 Ghosh et al. ................... 370/433
(Continued)

FOREIGN PATENT DOCUMENTS

| CN | 101189903 A | 5/2008 |
| EP | 2112845 A1 | 10/2009 |
| WO | WO 2011/008002 A2 | 1/2011 |

OTHER PUBLICATIONS

Fujitsu, "On implicit CC deactivation," 3GPP TSG-RAN WG2 Meeting #69bis, R2-102161, Apr. 12-16, 2010.
(Continued)

*Primary Examiner* — Warner Wong
(74) *Attorney, Agent, or Firm* — Squire Patton Boggs (US) LLP

(57) ABSTRACT

In one exemplary embodiment of the invention, a method includes: measuring at least one characteristic of a secondary component carrier to obtain a measurement result, where measuring is performed by an apparatus while the apparatus is in communication with a network via a primary component carrier with a network access node; and in response to the measurement result of the at least one characteristic being below a threshold, and further in response to receiving from the network access node an activation command for the secondary component carrier, considering the secondary component carrier as being undetectable.

19 Claims, 6 Drawing Sheets

---

4A: MEASURING AT LEAST ONE CHARACTERISTIC OF A DOWNLINK SECONDARY COMPONENT CARRIER

↓

4B: WHEN A MEASUREMENT RESULT OF THE AT LEAST ONE CHARACTERISTIC IS BELOW SOME THRESHOLD, CONSIDERING THE DOWNLINK SECONDARY COMPONENT CARRIER AS BEING UNDETECTABLE IN THE EVENT AN ACTIVATION COMMAND FOR A SECONDARY COMPONENT CARRIER IS RECEIVED FROM A NETWORK ACCESS NODE

(51) Int. Cl.
*H04W 74/00* (2009.01)
*H04L 5/00* (2006.01)
*H04W 72/08* (2009.01)
*H04W 76/06* (2009.01)

(52) U.S. Cl.
CPC .......... *H04W72/085* (2013.01); *H04W 74/002* (2013.01); *H04W 76/064* (2013.01)

(56) References Cited

U.S. PATENT DOCUMENTS

| | | | |
|---|---|---|---|
| 8,989,107 B2 * | 3/2015 | Sambhwani et al. | 370/329 |
| 2001/0030948 A1 * | 10/2001 | Tiedemann, Jr. | 370/305 |
| 2006/0172759 A1 | 8/2006 | Ishihara | |
| 2008/0102834 A1 * | 5/2008 | Bernhard et al. | 455/436 |
| 2008/0316969 A1 * | 12/2008 | Prakash et al. | 370/331 |
| 2010/0034176 A1 | 2/2010 | Heo et al. | |
| 2010/0086088 A1 * | 4/2010 | Lie et al. | 375/346 |
| 2010/0130219 A1 * | 5/2010 | Cave et al. | 455/450 |
| 2011/0243106 A1 * | 10/2011 | Hsu et al. | 370/336 |
| 2012/0115468 A1 * | 5/2012 | Lindoff et al. | 455/434 |
| 2013/0195039 A1 * | 8/2013 | Pan et al. | 370/329 |
| 2014/0233396 A1 * | 8/2014 | Marinier et al. | 370/242 |

OTHER PUBLICATIONS

International Search Report dated Jun. 30, 2011 corresponding to International Patent Application No. PCT/FI2011/050319.
3GPP TSG-RAN2#69bis; R2-102488, "CA UL/DL CC Failures", E-Mail Rapporteur (NTT DOCOMO, Inc.) Feb. 15-19, 2010, pp. 1-18.
Chinese Office Action application No. 201180013332.8 dated Aug. 29, 2014.
Office Action dated May 6, 2015, issued in corresponding CN Patent Application No. 201180013332.8 (with English translation). X.

* cited by examiner

USER EQUIPMENT CARRIER ACTIVATION

TECHNICAL FIELD

The exemplary and non-limiting embodiments of this invention relate generally to wireless communication systems, apparatus, methods, devices and computer programs and, more specifically, relate to user equipment operation with carrier aggregation and to techniques for activating and deactivating component carriers.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
BS base station
BW bandwidth
CA carrier aggregation
CC component carrier
CQI channel quality indicator
DL downlink (Node B/eNB towards UE)
eNB E-UTRAN Node B (evolved Node B)
EPC evolved packet core
Ês received energy per resource element (power normalized to the subcarrier spacing) during the useful part of the symbol, i.e., excluding the cyclic prefix, at the UE antenna connector
E-UTRAN evolved UTRAN (LTE)
FDMA frequency division multiple access
HSPA high speed packet access
IMTA international mobile telecommunications association
IoT received power spectral density of the total noise and interference for a certain resource element (power integrated over the resource element and normalized to the subcarrier spacing) as measured at the UE antenna connector
ITU-R international telecommunication union-radiocommunication sector
LTE long term evolution of UTRAN (E-UTRAN)
LTE-A LTE advanced
MAC medium access control (layer 2, L2)
MM/MME mobility management/mobility management entity
Node B base station
OFDMA orthogonal frequency division multiple access
O&M operations and maintenance
PCC primary component carrier
PDCP packet data convergence protocol
PDCCH physical downlink control channel
PDSCH physical downlink shared channel
PHY physical (layer 1, L1)
Rel release
RLC radio link control
RLF radio link failure
RRC radio resource control
RRH remote radio head
RRM radio resource management
RSRP reference signal received power
RSRQ reference signal received quality
RSSI received signal strength indicator
SC-FDMA single carrier, frequency division multiple access
SCC secondary component carrier
SGW serving gateway
UE user equipment, such as a mobile station, mobile node or mobile terminal
UL uplink (UE towards Node B/eNB)
UTRAN universal terrestrial radio access network One modern communication system is known as evolved UTRAN (E-UTRAN, also referred to as UTRAN-LTE or as E-UTRA). In this system the DL access technique is OFDMA, and the UL access technique is SC-FDMA.

One specification of interest is 3GPP TS 36.300, V8.11.0 (2009-12), "3rd Generation Partnership Project; Technical Specification Group Radio Access Network; Evolved Universal Terrestrial Radio Access (E-UTRA) and Evolved Universal Terrestrial Access Network (EUTRAN); Overall description; Stage 2 (Release 8)." This system may be referred to for convenience as LTE Rel-8. In general, the set of specifications given generally as 3GPP TS 36.xyz (e.g., 36.211, 36.311, 36.312, etc.) may be seen as describing the Release 8 LTE system. More recently, Release 9 versions of at least some of these specifications have been published including 3GPP TS 36.300, V9.1.0 (2009-9).

FIG. 1A reproduces FIG. 4.1 of 3GPP TS 36.300 V8.11.0, and shows the overall architecture of the EUTRAN system (Rel-8). The E-UTRAN system includes eNBs, providing the E-UTRAN user plane (PDCP/RLC/MAC/PHY) and control plane (RRC) protocol terminations towards the UE (not shown). The eNBs are interconnected with each other by means of an X2 interface. The eNBs are also connected by means of an S1 interface to an EPC, more specifically to a MME by means of a S1 MME interface and to an S-GW by means of a S1 interface (MME/S-GW 4). The S1 interface supports a many-to-many relationship between MMEs/S-GWs and eNBs.

The eNB hosts the following functions:
functions for RRM: RRC, Radio Admission Control, Connection Mobility Control, Dynamic allocation of resources to UEs in both UL and DL (scheduling);
IP header compression and encryption of the user data stream;
selection of a MME at UE attachment;
routing of User Plane data towards the EPC (MME/S-GW);
scheduling and transmission of paging messages (originated from the MME);
scheduling and transmission of broadcast information (originated from the MME or O&M); and
a measurement and measurement reporting configuration for mobility and scheduling.

Of particular interest herein are the further releases of 3GPP LTE (e.g., LTE Rel-10) targeted towards future IMTA systems, referred to herein for convenience simply as LTE-Advanced (LTE-A). Reference in this regard may be made to 3GPP TR 36.913, V9.0.0 (2009-12), 3rd Generation Partnership Project; Technical Specification Group Radio Access Network; Requirements for Further Advancements for E-UTRA (LTE-Advanced) (Release 9). Reference can also be made to 3GPP TR 36.912 V9.2.0 (2010-03) Technical Report 3rd Generation Partnership Project; Technical Specification Group Radio Access Network; Feasibility study for Further Advancements for E-UTRA (LTE-Advanced) (Release 9).

A goal of LTE-A is to provide significantly enhanced services by means of higher data rates and lower latency with reduced cost. LTE-A is directed toward extending and optimizing the 3GPP LTE Rel-8 radio access technologies to provide higher data rates at lower cost. LTE-A will be a more optimized radio system fulfilling the ITU-R requirements for IMT-Advanced while keeping the backward compatibility with LTE Rel-8.

As specified in 3GPP TR 36.913, LTE-A should operate in spectrum allocations of different sizes, including wider spectrum allocations than those of LTE Rel-8 (e.g., up to 100 MHz) to achieve the peak data rate of 100 Mbit/s for high mobility and 1 Gbit/s for low mobility. It has been agreed that carrier aggregation (CA) is to be considered for LTE-A in order to support bandwidths larger than 20 MHz. Carrier aggregation, where two or more component carriers (CCs) are aggregated, is considered for LTE-A in order to support transmission bandwidths larger than 20 MHz. The carrier aggregation could be contiguous or non-contiguous. This technique, as a bandwidth extension, can provide significant gains in terms of peak data rate and cell throughput as compared to non-aggregated operation as in LTE Rel-8.

A terminal may simultaneously receive one or multiple component carriers depending on its capabilities. A LTE-A terminal with reception capability beyond 20 MHz can simultaneously receive transmissions on multiple component carriers. An LTE Rel-8 terminal can receive transmissions on a single component carrier only, provided that the structure of the component carrier follows the Rel-8 specifications. Moreover, it is required that LTE-A should be backwards compatible with Rel-8 LTE in the sense that a Rel-8 LTE terminal should be operable in the LTE-A system, and that a LTE-A terminal should be operable in a Rel-8 LTE system.

FIG. 1B shows an example of the carrier aggregation, where M Rel-8 component carriers are combined together to form a total MHRel-8 BW (e.g. 5 H 20 MHz=100 MHz given M=5). Rel-8 terminals receive/transmit on one component carrier, whereas LTE-A terminals may receive/transmit on multiple component carriers simultaneously to achieve higher (wider) bandwidths.

In CA multiple cells (or UL/DL CCs) can be aggregated for multi-carrier transmission/reception. It has been agreed that the configuration of the DL/UL CC for CA is to be performed using RRC signaling between the eNB and the UE. One UL and DL CC are configured for a primary CC (PCC), while other CCs are referred to as secondary CCs (SCC).

It has also been agreed that in order to enable UE battery savings a separate MAC level activation/deactivation mechanism is to be introduced for the DL SCC and also potentially for the UL SCC. However, according to the current agreement there is no need to have a separate activation mechanism for the UL SCC.

SUMMARY

The below summary section is intended to be merely exemplary and non-limiting.

In one exemplary embodiment of the invention, a method comprising: measuring at least one characteristic of a secondary component carrier to obtain a measurement result, where measuring is performed by an apparatus while the apparatus is in communication with a network via a primary component carrier with a network access node; and in response to the measurement result of the at least one characteristic being below a threshold, and further in response to receiving from the network access node an activation command for the secondary component carrier, considering the secondary component carrier as being undetectable.

In another exemplary embodiment of the invention, an apparatus comprising: means for measuring at least one characteristic of a secondary component carrier to obtain a measurement result, where measuring is performed by an apparatus while the apparatus is in communication with a network via a primary component carrier with a network access node; and means for, in response to the measurement result of the at least one characteristic being below a threshold, and further in response to receiving from the network access node an activation command for the secondary component carrier, considering the secondary component carrier as being undetectable.

In a further exemplary embodiment of the invention, an apparatus comprising: at least one processor; and at least one memory including computer program code, the at least one memory and the computer program code being configured to, with the at least one processor, cause the apparatus at least to perform: measuring at least one characteristic of a secondary component carrier to obtain a measurement result, where measuring is performed by an apparatus while the apparatus is in communication with a network via a primary component carrier with a network access node; and in response to the measurement result of the at least one characteristic being below a threshold, and further in response to receiving from the network access node an activation command for the secondary component carrier, considering the secondary component carrier as being undetectable.

In another exemplary embodiment of the invention, a method comprising: measuring at least one characteristic of a secondary component carrier to obtain a measurement result, where measuring is performed by an apparatus while the apparatus is in communication with a network via a primary component carrier; and in response to the measurement result of the at least one characteristic being below a threshold, triggering at least one of an implicit de-activation of the secondary component carrier and reduced monitoring and measurement requirements for the secondary component carrier.

In another exemplary embodiment of the invention, an apparatus comprising: means for measuring at least one characteristic of a secondary component carrier to obtain a measurement result, where measuring is performed by the apparatus while the apparatus is in communication with a network via a primary component carrier; and means for, in response to the measurement result of the at least one characteristic being below a threshold, triggering at least one of an implicit de-activation of the secondary component carrier and reduced monitoring and measurement requirements for the secondary component carrier.

In a further exemplary embodiment of the invention, an apparatus comprising: at least one processor; and at least one memory including computer program code, the at least one memory and the computer program code being configured to, with the at least one processor, cause the apparatus at least to perform: measuring at least one characteristic of a secondary component carrier to obtain a measurement result, where measuring is performed by an apparatus while the apparatus is in communication with a network via a primary component carrier; and in response to the measurement result of the at least one characteristic being below a threshold, triggering at least one of an implicit de-activation of the secondary component carrier and reduced monitoring and measurement requirements for the secondary component carrier.

In a further exemplary embodiment of the invention, a method comprising: detecting an occurrence of a particular type of measurement event for a secondary component carrier that is used for communication with a second network access node, where detecting is performed by an apparatus while the apparatus is in communication with a first network access node via a primary component carrier; in response to detection of the particular type of measurement event, generating a measurement report for the secondary component carrier; and in response to detection of the particular type of measurement event, generating a measurement report for the secondary component carrier; and In another exemplary embodiment of the invention, an apparatus comprising: means for detecting an occurrence of a particular type of measurement event for a secondary component carrier that is used for communication with a second network access node, where detecting is performed by an apparatus while the apparatus is in communication with a first network access node via a primary component carrier; means for, in response to detection of the particular type of measurement event, generating a measurement report for the secondary component carrier; and means for sending the measurement report from the apparatus to the first network access node.

In a further exemplary embodiment of the invention, an apparatus comprising: at least one processor; and at least one memory including computer program code, the at least one memory and the computer program code being configured to, with the at least one processor, cause the apparatus at least to perform: detecting an occurrence of a particular type of measurement event for a secondary component carrier that is used for communication with a second network access node, where detecting is performed by an apparatus while the apparatus is in communication with a first network access node via a primary component carrier; in response to detection of the particular type of measurement event, generating a measurement report for the secondary component carrier; and sending the measurement report from the apparatus to the first network access node.

BRIEF DESCRIPTION OF THE DRAWINGS

The foregoing and other aspects of exemplary embodiments of this invention are made more evident in the following Detailed Description, when read in conjunction with the attached Drawing Figures, wherein.

DETAILED DESCRIPTION

Figures 1A, 1B:
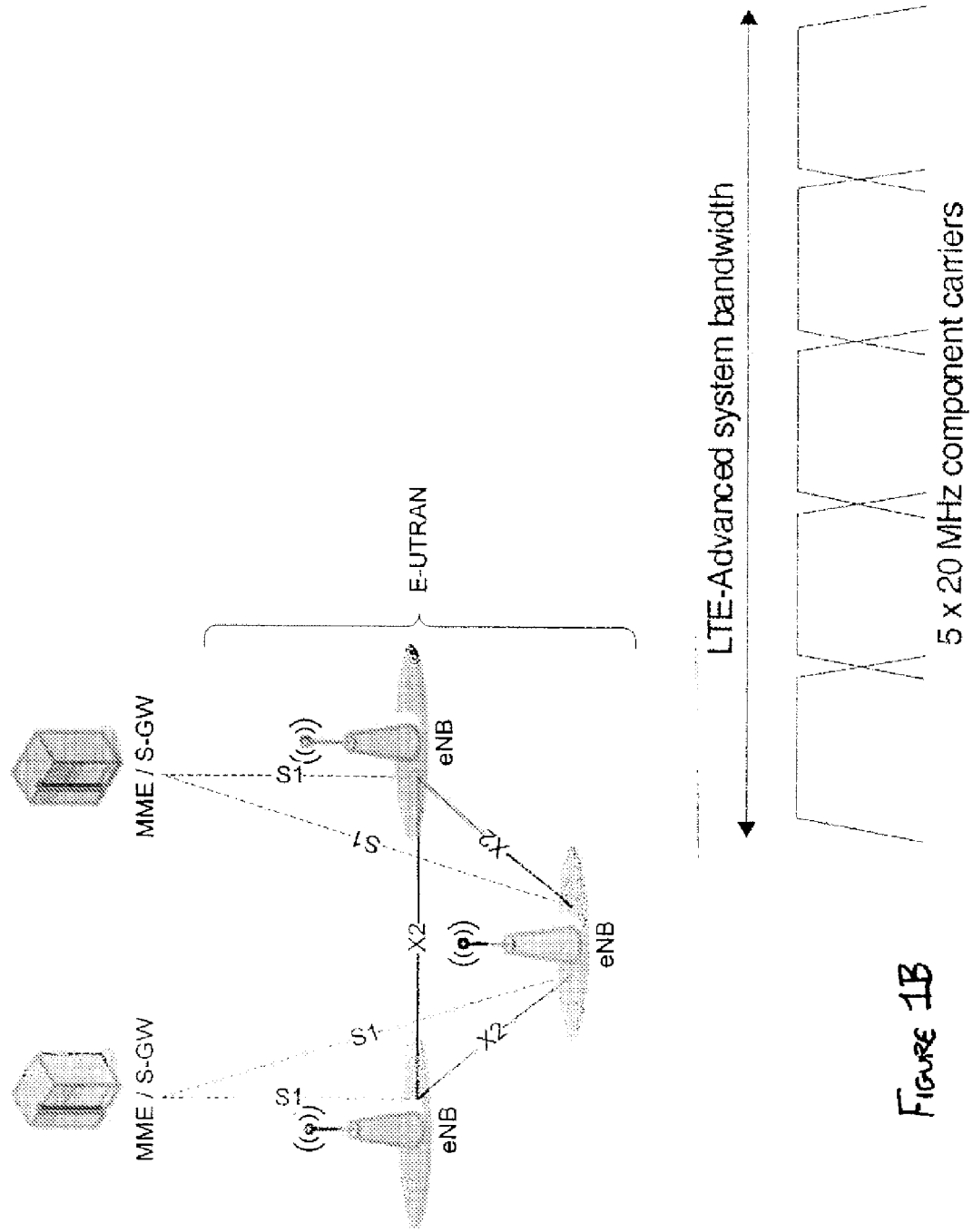
FIG. 1A reproduces FIG. 4.1 of 3GPP TS 36.300, and shows the overall architecture of the EUTRAN system.
FIG. 1B shows an example of carrier aggregation as proposed for the LTE-A system.

It can be expected in LTE-A that the UE power consumption will depend heavily on the number of activated component carriers, and from a power efficiency point of view it is desirable to operate on as few component carriers as possible, while still maintaining the required quality of service. In an ideal network, the activation and deactivation of CCs would happen on a need basis according to traffic conditions and quality of service requirements, and ensure that UEs are transferred to their most efficient mode as soon as their traffic pattern and service requirements allow for this.

It was noted above that in accordance with current proposals there is no need to have a separate activation mechanism for the UL SCC. However, this can result in problems on the UE side. There are proposals for applying a 'linked UL activation', i.e., the UL SCC is activated when its linked DL SCC is activated. In this case, then, the UL SCC cannot be activated without activation of the paired/linked DL SCC. Reference in this regard can be made to 3GPP TSG-RAN WG2 Meeting #69bis, R2-102099, Beijing, China, 12-16 Apr. 2010, Source: Nokia Corporation, Nokia Siemens Networks, Title: Discussion on UL CC activation and deactivation.

The specific details of the configuration of the CC and UE requirements for configured (but de-activated) or configured (and active) DL SCC are currently open. However, some agreements are been made in this regard. For example, reference can be made to TSG RAN meeting #47, RP-100056, Vienna, Austria, 16-19 Mar. 2010, Status Report to TSG; TSG RAN meeting #47, RP-100057, Vienna, Austria, 16-19 Mar. 2010, Status Report to TSG; and 3GPP TSG-RAN WG2 Meeting #69, R2-101846, San Francisco, U.S.A., 22-26 Feb. 2010, CR-Form-v9.6 CHANGE REQUEST 36.300 CR 0190.

With regard to the measurement configuration: measurements on activated CCs can be performed without measurement gaps. While all Rel-8/9 measurement events are applicable for a UE configured with CA, study is needed for how they are generalized for use with CA. For example, measurement events A1 and A2 are extended to SCCs, where a "serving cell" for these events is the cell corresponding to the configured CC cell (i.e., the network may configure separate events A1 and A2 for each cell corresponding to a configured CC). There is only one "serving cell" per measurement identifier (id), unless a clear need for multiple serving cells is subsequently identified.

General reference with respect to Rel-8/9 measurement events A1 and A2 (and A4, referred to below) can be made to 3GPP TS 36.331 V9.1.0 (2009-12) Technical Specification 3rd Generation Partnership Project; Technical Specification Group Radio Access Network; Evolved Universal Terrestrial Radio Access (E-UTRA) Radio Resource Control (RRC); Protocol specification (Release 9), sections 5.5.4 "Measurement Report Triggering" and 5.5.5 "Measurement Reporting". Particular attention can be paid to sub-sections 5.5.4.2 "Event A1 (Serving becomes better than threshold); 5.5.4.3 "Event A2 (Serving becomes worse that threshold"; and 5.5.4.5 "Event A4 (Neighbour becomes better than threshold)". Further reference may be made to sections 5 and/or 5.4 in general.

With regard to activation/deactivation: explicit activation of configured DL component carriers by MAC is agreed; explicit deactivation of configured DL CCs by MAC is agreed; implicit deactivation of DL CCs is agreed (details of which are currently under discussion); when a CC is configured it starts in a "deactivated" state; DL component carriers are activated and deactivated individually, where a single activation/deactivation command can activate/deactivate a subset of the configured DL CCs; when a downlink SCC is not active, the UE does not need to receive the corresponding PDCCH or PDSCH, nor is it required to perform CQI measurements; conversely, when a downlink SCC is active, the UE shall receive PDSCH and PDCCH (if present), and is expected to be able to perform CQI measurements.

Finally, with regard to DL RLF on SCCs, there is currently no re-establishment procedure specified for SCCs.

Moreover, current agreements allow preloading of a configured CC, i.e., component carriers can be configured DL SCC for CA even though the UE is not necessarily able to detect a cell.

An aspect of the exemplary embodiments of this invention provides a technique for how this configuration and activation can be accomplished by the eNB, and how the UE responds when the eNB activates a cell/frequency that the UE cannot "detect".

A MAC level activation/de-activation mechanism was introduced for LTE CA to enable improved UE battery life. As a result, the UE measurements should be done accordingly. Currently it has been agreed that the UE does not need to perform CQI measurements on a de-activated DL SCC.

Figure 3:
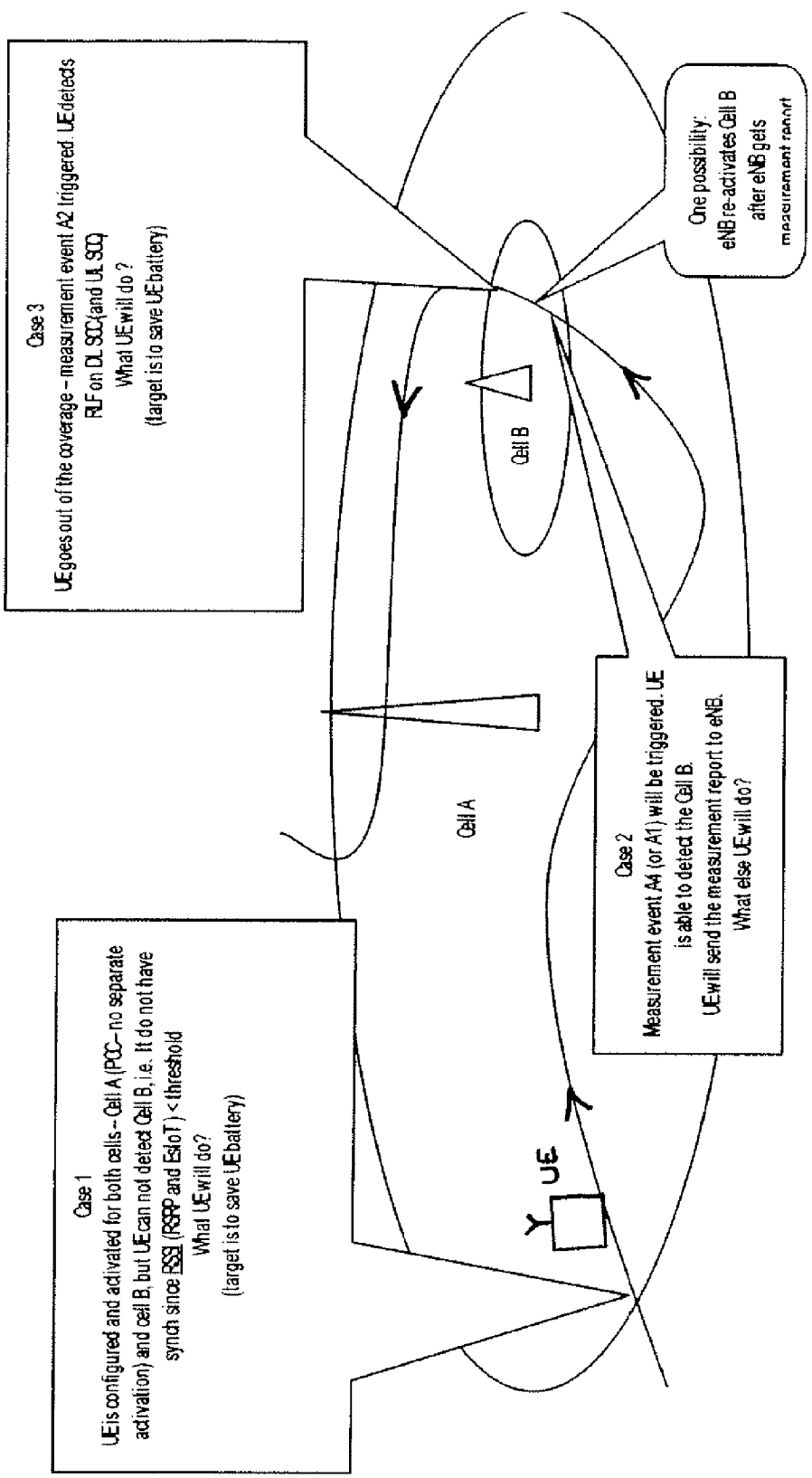
FIG. 3 shows several exemplary scenarios involving a UE moving within the cell area of an eNB containing a cell A, and also a RRH cell B with a different frequency and coverage area under the control of the same eNB.

Referring to FIG. 3, consider the following scenario (i.e., a simplified version of scenario 4 in the above-noted R2-101846) where the UE is moving within the cell area of an eNB containing cell A. There is also a RRH cell B with a different frequency and coverage area under the control of the same eNB. In this exemplary scenario, the UE travels towards the cell B.

The exemplary embodiments of this invention consider at least the following cases.

Case 1: How should the UE behave (and what are the requirements) when it is configured with Cell A (PCC) and Cell B (SCC), where the DL SCC, which cannot be detected, is activated?

Case 2: How should the UE behave when Cell B can be detected (if this cell has been activated)?

A third case in FIG. 3 can be considered, e.g., how should the UE behave when it goes out of the coverage area and measurement event A2 is triggered, where the UE detects the RLF on the DL SCC (and UL SSC)?

These types of problems have not arisen in LTE Rel-8 and Rel-9 since the UE has only one serving cell configured.

For the third case above, the handling of the RLF, reference can be made to 3GPP TSG-RAN2#69bis, R2-102488, 15-19 Feb. 2010, Beijing, China, Source: E-mail rapporteur (NTT DOCOMO, INC.), Title: CA UL/DL CC failures. If there is an implicit de-activation mechanism in Case 1 (which may not be desirable) the eNB would need to re-activate the Cell B (in response to receiving the measurement report) after Case 2, as shown in FIG. 3.

At present, it has been determined to provide an implicit de-activation mechanism. However, this is mainly done to handle Case 3. Reference in this regard can be made to 3GPP TSG-RAN WG2 Meeting #69 R2-101077, San Francisco, U.S.A., 22-26 Feb. 2010, Source: Nokia Siemens Networks, Nokia Corporation, Title: On the possibility for implicit release of activated secondary component carriers. A timer-based de-activation mechanism is introduced in R2-101077. This approach could be broadened to cover the case that the UE cannot find the cell.

Other possibly relevant contributions related at least partially to implicit de-activation can be found in 3GPP TSG RAN WG2 Meeting #69bis, R2-102064, Beijing, China, Apr. 12-16, 2009, Source: CATT, Title: Implicit CC Deactivation; 3GPP TSG-RAN WG2 Meeting #69bis, 82-102161, Beijing, China, Apr. 12-16, 2010, Source: Fujitsu, Title: On implicit CC deactivation; and 3GPP TSG-RAN WG2 Meeting #69bis, R2-102520, 12-16 Apr. 2010 in Beijing, China, Source: Panasonic, Title: MAC Control Element for Component Carrier Management.

Figure 2:
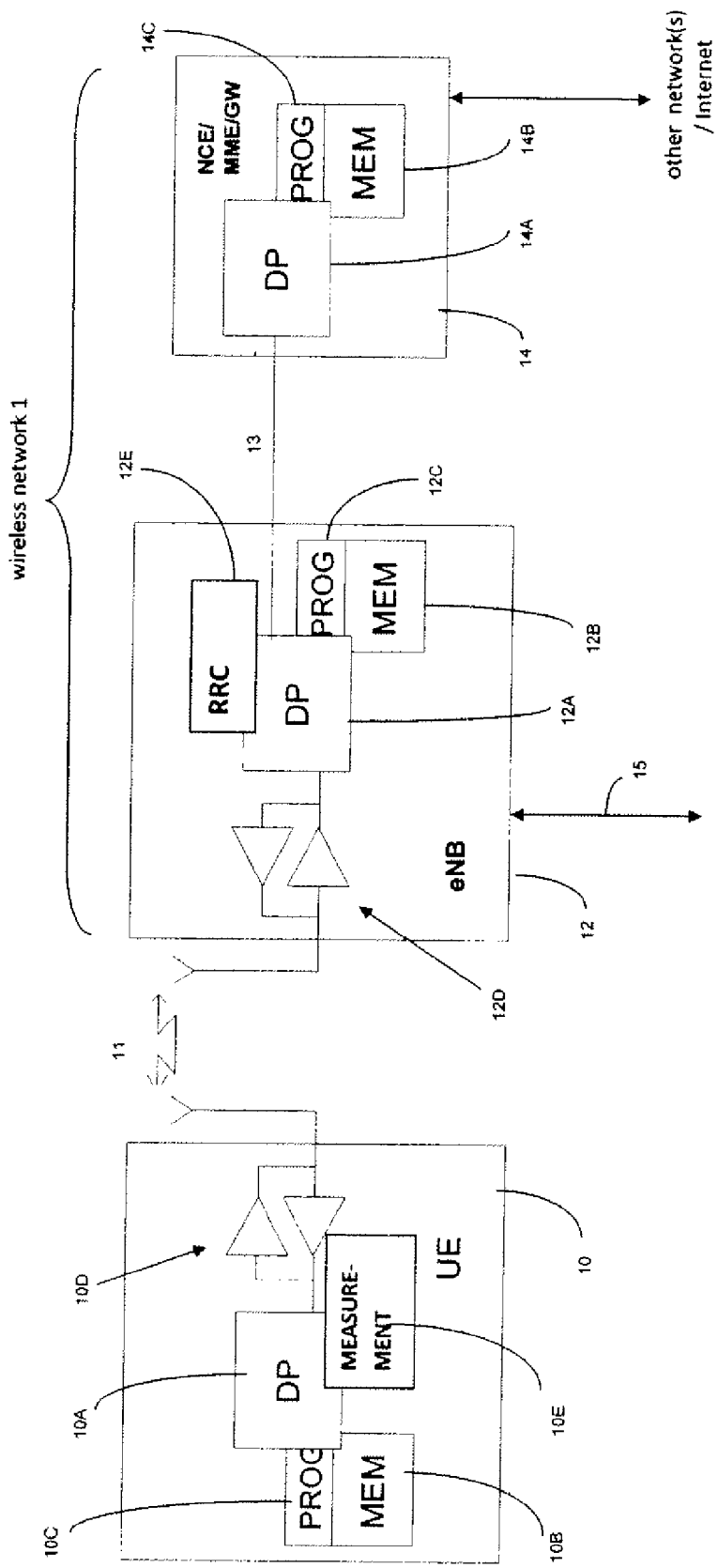
FIG. 2 shows a simplified block diagram of various electronic devices that are suitable for use in practicing the exemplary embodiments of this invention.

Before describing in further detail the exemplary embodiments of this invention, reference is made to FIG. 2 for illustrating a simplified block diagram of various electronic devices and apparatus that are suitable for use in practicing the exemplary embodiments of this invention. In FIG. 2 a wireless network 1 is adapted for communication over a wireless link 11 with an apparatus, such as a mobile communication device which may be referred to as a UE 10, via a network access node, such as a Node B (base station), and more specifically an eNB 12. The network 1 may include a network control element (NCE) 14 that may include the MME/SGW functionality shown in FIG. 1A, and which provides connectivity with a further network, such as a telephone network and/or a data communications network (e.g., the internet). The UE 10 includes a controller, such as at least one computer, processor or data processor (DP) 10A, at least one non-transitory computer-readable memory medium embodied as a memory (MEM) 10B that stores a program of computer instructions (PROG) 10C, and at least one suitable radio frequency (RF) transceiver 10D (e.g., having a transmitter and/or a receiver) for bidirectional wireless communications with the eNB 12 via one or more antennas. The eNB 12 also includes a controller, such as at least one computer or a data processor (DP) 12A, at least one computer-readable memory medium embodied as a memory (MEM) 12B that stores a program of computer instructions (PROG) 12C, and at least one suitable RF transceiver 12D for communication with the UE 10 via one or more antennas (typically several when multiple input/multiple output (MIMO) operation is in use). The eNB 12 is coupled via a data/control path 13 to the NCE 14. The path 13 may be implemented as the S1 interface shown in FIG. 1A. The eNB 12 may also be coupled to another eNB via data/control path 15, which may be implemented as the X2 interface shown in FIG. 1A.

For the purposes of describing the exemplary embodiments of this invention the UE 10 can be assumed to be capable of operation with CA, and to also include a received signal measurement function/module/apparatus (MEASUREMENT) 10E operable with the transceiver 10D. The eNB 12 can be assumed to also be capable of operation with CA, and to include a RRC function/module/apparatus (RRC) 12E configured to cooperate in activating and de-activating CCs and to perform the needed signaling with the UE 10. The eNB 12, in some exemplary embodiments, can establish and operate a plurality of cells, such as the cells A and B shown in the exemplary scenario of FIG. 3.

At least one of the PROGs 10C and 12C is assumed to include program instructions that, when executed by the associated DP, enable the device to operate in accordance with the exemplary embodiments of this invention, as will be discussed below in greater detail. That is, the exemplary embodiments of this invention may be implemented at least in part by computer software executable by the DP 10A of the UE 10 and/or by the DP 12A of the eNB 12, or by hardware, or by a combination of software and hardware (and firmware).

In general, the various exemplary embodiments of the UE 10 can include, but are not limited to, mobile nodes, mobile stations, mobile phones, cellular phones, personal digital assistants (PDAs) having wireless communication capabilities, mobile routers, relay stations, relay nodes, computers, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer-readable MEMs 10B and 12B may be of any type suitable to the local technical environment and may be implemented using any suitable volatile and/or non-volatile data storage technology, such as semiconductor based memory devices, random access memory, read only memory, programmable read only memory, flash memory, magnetic memory devices and systems, optical memory devices and systems, fixed memory and removable memory, as non-limiting examples. The DPs 10A and 12A may be of any type suitable to the local technical environment, and may include one or more of general purpose computers, special purpose computers, microprocessors, digital signal processors (DSPs) and processors based on multi-core processor architectures, as non-limiting examples.

While described above in reference to memories (MEMs 10B and 12B), these components may generally be seen to correspond to storage devices, storage circuits, storage components and/or storage blocks. In some exemplary embodiments, these components may comprise one or more computer-readable mediums, one or more computer-readable memories and/or one or more program storage devices.

While described above in reference to data processors (DPs 10A and 12A), these components may generally be seen to correspond to processors, processing devices, processing components, processing blocks, circuits, circuit devices, circuit components, circuit blocks, integrated circuits and/or chips (e.g., chips comprising one or more circuits or integrated circuits).

The exemplary embodiments of this invention are now described in further detail.

In that the CC activation/de-activation is introduced mainly for UE 10 power saving purposes, the UE 10 requirements (measurement and CQI transmission) can be changed in the following manner depending on how the UE 10 is able to detect cells.

In a first aspect or step of the exemplary embodiments a signal quality check is introduced for the activation command. In accordance with this aspect if the signal quality of a corresponding DL SCC is low enough that the UE 10 considers the DL SCC signal as undetectable when the UE 10 receives an activation command for a SCC from the eNB 12, the UE 10 continues to treat the SCC as de-activated. Alternatively, the SCC is not regarded by the UE 10 as in the de-activated state, but instead the SCC is in the activated but not actively monitoring state. The UE 10 requirements for the corresponding SCC are accordingly configured and the DL SCC is de-activated. That is, no CQI measurements are performed on the SCC/there is no CQI transmission (alternatively the UE 10 indicates or reports a very low CQI, i.e., CQI index0). Cell search and measurements are performed according to some lower performance requirements than those given for intra-frequency cell search and measurements. One example would be to follow the requirements given for inter-frequency requirements, as a non-limiting example. In one exemplary embodiment, a signal quality threshold may be signaled from the eNB 12 to the UE 10 in order to assist the UE 10 in performing the signal quality check. The signal quality threshold may be signaled with the activation command or before the activation command, as non-limiting examples. It is also possible for the UE 10 to utilize a predefined threshold (e.g., without explicit signal quality threshold signaling needed).

In a second aspect or step of the exemplary embodiments, when a measurement event, for example, A4 (or some similar event in Rel-10 which indicates that there is a new DL SCC that the UE 10 could possibly utilize), is triggered in the UE 10, the UE 10 reports this measurement event as any other measurement event. Moreover, if A4 is triggered for a DL SCC that the eNB 12 has (at least once) attempted to activate, but for which the UE 10 requirements are according to a de-activated SCC (for example, due to a signal quality threshold limit as above in the first step, or some other implicit mechanism which has changed the UE 10 requirements), the requirements for the SCC would autonomously follow the requirements of an activated SCC. That is, the UE 10 will start to monitor the PDCCH in DL, would perform CQI measurements (and potentially report those measurements) and would perform cell search and measurements according to activated SCC requirements (which could, as an example, be similar to intra-frequency requirements). For example, the former 'de-activated' SCC (as described above) is changing state to the activated state from this semi-activated state.

There are several alternative techniques to address this problem. What follows are several possible techniques that can be used which restrict the eNB 12 freedom to send an activation command to the UE 10.

One possible solution is to avoid allowing the eNB 12 to activate those SCCs that are not detected or detectable by the UE 10. For example, a rule can be established that the eNB 12 can only activate a CC that the UE 10 can detect, i.e., those cells which have been detected by the UE 10 and where (potentially) a measurement event A4 (or A1) has been triggered in the UE 10 and the corresponding measurement report potentially sent to the eNB 12. Other techniques (e.g., other than a measurement report) can be used as means for indicating the availability of an SCC to the eNB 12. As one non-limiting example, a valid CQI report could be used. This can also include a case where the UE 10 has not yet managed to send the measurement report, but where it would have reported, for example, event A2 (or RLF) of the corresponding SCC (e.g., where it would have indicated that a given SCC is no longer available). Yet another possibility is to employ a UE-defined or network-signaled mechanism (based on, e.g., RSSI, RSRP, RSRQ and/or Ês/IoT threshold) for detectability: If the received signal is less than a threshold value the UE 10 considers the SCC as undetectable (not detected, not detectable).

This approach (based on the network, i.e., the eNB 12, not being allowed to activate cells that are not detectable by the UE 10) however does not address the UE 10 behavior when the eNB 12 sends a SCC activation message that should not have been sent to the EU 10. One solution is to have the UE 10 simply ignore such an activation message and consider it as a network error. Alternatively, the UE 10 can signal back to the network the occurrence of an 'activation error' (i.e., the SCC was not actually activated although it was ordered to be activated).

Further with regard to the first exemplary aspect/step discussed above, it can be noted that it is not yet specified whether there is a need for separate handling of the configured DL SCC which the eNB 12 has requested be activated, but which is below the signal quality threshold. Thus, the threshold can serve as an implicit de-activation mechanism.

Further it can be noted that this aspect implies that the UE 10 requirements for corresponding the CC are according to the de-activated CC. However, this is not yet an implicit de-activation mechanism in the UE 10.

It can further be noted that this aspect implies an improvement in UE 10 battery life by reducing UE 10 power consumption.

Note further that an RSSI measurement may be viewed as a potentially best approach to the signal quality threshold since it is a very simple measurement that can be performed quickly. In the UE 10 implementation there can be some internal threshold to define whether the UE 10 attempts to perform a cell search procedure for a cell. Note further that the RSSI measurement has not been defined as such in 3GPP for any action before (it is not defined as a reportable measurement quantity), but previously has been defined only as part of another measurement (namely the RSRQ measurement where RSRQ=RSRP/RSSI).

Reference in this regard can be made to 3GPP TS 36.214 V9.0.0 (2009-12) Technical Specification 3rd Generation Partnership Project; Technical Specification Group Radio Access Network; Evolved Universal Terrestrial Radio Access (E-UTRA); Physical layer-Measurements (Release 9), specifically Section 5.1.3, where RSRQ is defined as the ratio NHRSRP/(E-UTRA carrier RSSI), where N is the number of resource blocks of the E-UTRA carrier RSSI measurement bandwidth. The measurements in the numerator and denominator are made over the same set of resource blocks. The E-UTRA Carrier RSSI is said to comprise the linear average of the total received power (in [W]) observed only in OFDM symbols containing reference symbols for antenna port 0, in the measurement bandwidth, over Nnumber of resource blocks by the UE from all sources, including co-channel serving and non-serving cells, adjacent channel interference, thermal noise, etc. The reference point for the RSRQ is defined as the antenna connector of the UE.

It can be noted that this first aspect/step also can be used as a trigger for implicit de-activation of a CC.

Further with regard to the second aspect/step discussed above, it can be noted that it may be assumed that the corresponding DL SCC is out of the coverage area from the UE 10 point of view. Thus the UE 10 is not able to send or receive anything on the activated SCC, and performs the measurement for that SCC according to the requirements of a de-activated SCC (and does not send CQI reports, or sends a CQI index of zero without actually measuring the CQI).

It can further be noted that a separation of the handling of different DL SCCs, with UE 10 measurement requirements according to a de-activated DL SCC, can also be based on whether there are CQI resources assigned to the specific DL SCC. Thus, assigned CQI resources can be considered as an indication as to whether the UE 10 waits for the eNB 12 to change the UE requirements via an activation command, or a measurement event and potential reporting (or other indication) to the eNB 12 may be sufficient to change the UE requirements for measurements and to begin sending corresponding CQI reports.

Note as well that there may be a report, requested by the eNB 12, that the UE 10 sends and that contains information about which SCCs the UE 10 has been able to measure.

In the event of the Case 2 (see FIG. 3), if it is decided to include CQI resources for the SCC activation mechanism then the second aspect/step above may be viewed as beneficial to the network vendor.

It should be noted that the implicit de-activation mechanism may be less desirable, as the UE 10 and the eNB 12 may become un-synchronized since the eNB 12 does not know when the UE 10 has de-activated the SCC. An alternative to actual de-activation would be to keep the SCC in the activated state in the UE 10 but lower the monitoring and measurement requirements on such a SCC.

Further with regard to the approach of only allowing the eNB 12 to activate the DL SCC(s) that the UE 10 can detect, it can be appreciated that the eNB 12 may not have a correct understanding of the UE situation (e.g., if the UE 10 has already lost the connection to the corresponding cell), as there is a delay between the eNB 12 and the UE 10. Further, in 3GPP it is not normally specified what eNB 12 can or cannot do, thus the UE 10 should still know what to do in those cases that arise with respect to the SCC activation command. Note that relying on a network error approach may increase the signaling overhead in the network.

However, the eNB 12 could still be aware of some SCCs if the UE 10 has been able to send an A1/A4 report of a particular SCC, since it is likely that the eNB 12 may activate the SCC only if a need arises to increase the data rate for the UE 10.

A timer-based de-activation mechanism is a potential solution, however timers can typically require some long amount of time to be effective, and furthermore the timer may not be started at all if the UE 10 cannot find the cell. A timer can be introduced to solve the problem associated with case 3 above (FIG. 3). However, a timer-based approach can reduce the scheduling flexibility in the network if the network uses CA to more efficiently utilize radio resources, and not only for increasing peak data rates. Thus in those cases the network may configure timers to be long to protect the possibility that the network does not schedule anything on a particular CC for some period of time.

As noted above, various exemplary embodiments of the invention may be suitable for use in conjunction with one or more measurement report triggering events, such as those specified in Section 5.5.4 of 3GPP TS 36.331 V9.1.0 (2009-12), for example. As non-limiting examples, these triggering events may include one or more of the following events, as defined in TS 36.331 (e.g., V9.1.0): A1, A2, A4, A5, B1 and/or B2. General information concerning triggered events and resulting actions can be found in Section 5.5.4.1 of TS 36.331 (V9.1.0). Furthermore, specific information regarding measurement reporting (i.e., transmission of a measurement report from the UE to the E-UTRAN/eNB) can be found in Section 5.5.5 of TS 36.331 (V9.1.0). It is also noted that information for events A5, B1 and B2 can be found in Sections 5.5.4.6, 5.5.4.7 and 5.5.4.8 of TS 36.331 (V9.1.0), respectively.

By way of example, below are provided Sections 5.5.4.2, 5.5.4.3 and 5.5.4.5 of TS 36.331 (V9.1.0) describing events A1, A2 and A4, respectively. It is noted that this document (TS 36.331 V9.1.0) was incorporated by reference in the priority U.S. provisional application.

5.5.4.2 Event A1 (Serving Becomes Better than Threshold)

The UE shall:
1> consider the entering condition for this event to be satisfied when condition A1-1, as specified below, is fulfilled;
1> consider the leaving condition for this event to be satisfied when condition A1-2, as specified below, is fulfilled;

Inequality A1-1 (Entering condition)
$Ms - Hys > Thresh$

Inequality A1-2 (Leaving condition)
$Ms + Hys < Thresh$

The variables in the formula are defined as follows:
$Ms$ is the measurement result of the serving cell, not taking into account any offsets.
$Hys$ is the hysteresis parameter for this event (i.e. hysteresis as defined within reportConfigEUTRA for this event).

Thresh is the threshold parameter for this event (i.e. a1-Threshold as defined within reportConfigEUTRA for this event).

Ms is expressed in dBm in case of RSRP, or in dB in case of RSRQ.

Hys is expressed in dB.

Thresh is expressed in the same unit as Ms.

5.5.4.3 Event A2 (Serving Becomes Worse than Threshold)

The UE shall:

1> consider the entering condition for this event to be satisfied when condition A2-1, as specified below, is fulfilled;

1> consider the leaving condition for this event to be satisfied when condition A2-2, as specified below, is fulfilled;

Inequality A2-1 (Entering condition)

Ms+Hys<Thresh

Inequality A2-2 (Leaving condition)

Ms−Hys>Thresh

The variables in the formula are defined as follows:

Ms is the measurement result of the serving cell, not taking into account any offsets.

Hys is the hysteresis parameter for this event (i.e. hysteresis as defined within reportConfigEUTRA for this event).

Thresh is the threshold parameter for this event (i.e. a2-Threshold as defined within reportConfigEUTRA for this event).

Ms is expressed in dBm in case of RSRP, or in dB in case of RSRQ.

Hys is expressed in dB.

Thresh is expressed in the same unit as Ms.

5.5.4.5 Event A4 (Neighbour Becomes Better than Threshold)

The UE shall:

1> consider the entering condition for this event to be satisfied when condition A4-1, as specified below, is fulfilled;

1> consider the leaving condition for this event to be satisfied when condition A4-2, as specified below, is fulfilled;

Inequality A4-1 (Entering condition)

Mn+Ofn+Ocn−Hys>Thresh

Inequality A4-2 (Leaving condition)

Mn+Ofn+Ocn+Hys<Thresh

The variables in the formula are defined as follows:

Mn is the measurement result of the neighbouring cell, not taking into account any offsets.

Ofn is the frequency specific offset of the frequency of the neighbour cell (i.e. offsetFreq as defined within measObjectEUTRA corresponding to the frequency of the neighbour cell).

Ocn is the cell specific offset of the neighbour cell (i.e. cellIndividualOffset as defined within measObjectEUTRA corresponding to the frequency of the neighbour cell), and set to zero if not configured for the neighbour cell.

Hys is the hysteresis parameter for this event (i.e. hysteresis as defined within reportConfigEUTRA for this event).

Thresh is the threshold parameter for this event (i.e. a4-Threshold as defined within reportConfigEUTRA for this event).

Mn is expressed in dBm in case of RSRP, or in dB in case of RSRQ. Ofn, Ocn, Hys are expressed in dB.

Thresh is expressed in the same unit as Ms.

It is noted that in some exemplary embodiments, at least for events A1 and A2 the measurements may be with reference to the SCC as opposed to the "serving cell." In further exemplary embodiments, such an extension may apply to one or more of the other events.

Based on the foregoing it should be apparent that the exemplary embodiments of this invention provide methods, apparatus and computer programs to operate a user equipment in an energy efficient manner with a network access node in a carrier aggregation environment, wherein primary and secondary component carriers are assignable to the user equipment and can be activated and de-activated.

Figure 4:
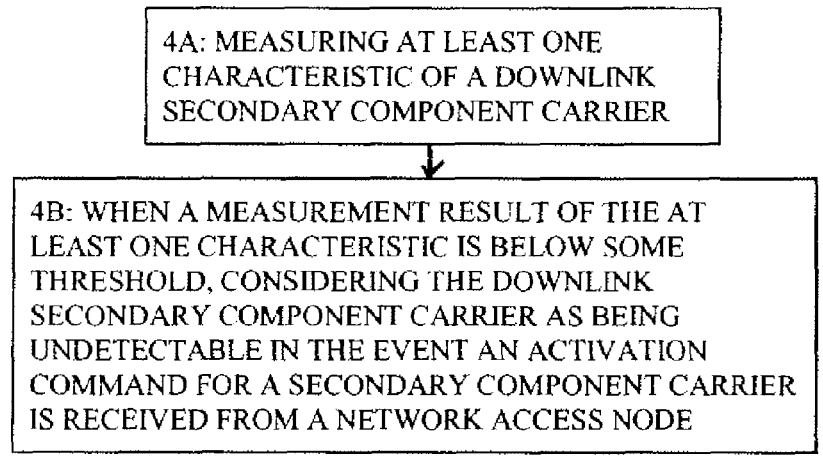
FIGS. 4, 5 and 6 are each a logic flow diagram that illustrates the operation of an exemplary method, and/or a result of execution of computer program instructions embodied on a computer readable memory, in accordance with the exemplary embodiments of this invention.

FIG. 4 is a logic flow diagram that illustrates the operation of a method, and a result of execution of computer program instructions, in accordance with the exemplary embodiments of this invention. In accordance with these exemplary embodiments a method performs, at Block 4A, a step of measuring at least one characteristic of a downlink secondary component carrier. At Block 4B there is a step performed, when a measurement result of the at least one characteristic is below some threshold, of considering the downlink secondary component carrier as being undetectable in the event an activation command for a secondary component carrier is received from a network access node.

In the method of the preceding paragraph, where considering the downlink secondary carrier as undetectable comprises implicitly considering the secondary component carrier as being de-activated. The method as in any above, where considering the downlink secondary carrier as undetectable comprises considering the secondary component carrier as being activated but not actively monitoring (e.g., not actively monitoring the PDCCH).

In the method of the preceding paragraphs, where considering the secondary component carrier as being de-activated comprises inhibiting a channel quality indicator measurement of the secondary component carrier. The method as in any above, where PDCCH monitoring is skipped (e.g., ignored, not performed).

In the method of the preceding paragraphs, where considering the secondary component carrier as being de-activated comprises inhibiting the sending of a channel quality indicator report to the network access node, or sending a predetermined channel quality indicator report that indicates a low or zero channel quality.

In the method of the preceding paragraphs, where the threshold serves as an implicit secondary component carrier de-activation mechanism. The method as in any above, where the threshold serves to lower the monitoring (e.g., of the PDCCH) and measurement and cell search requirements (e.g., while maintaining the secondary component carrier in an active state).

In the method of the preceding paragraphs, where the measurement comprises a received signal strength measurement.

In the method of the preceding paragraphs, where the measured at least one characteristic of the downlink secondary component carrier comprises at least one of signal strength, signal quality and signal power.

In the method of the preceding paragraphs, used as a trigger for an implicit de-activation of a component carrier.

In the method of the preceding paragraphs, and in response to receiving the secondary component carrier activation command from the network access node, considering the activation command as a network error.

In the method of the preceding paragraphs, and in response to receiving the secondary component carrier activation command from the network access node, signaling an indication (e.g., an occurrence of an activation error, an indication that scheduling is not possible (e.g., due to non-detection of the SCC)) to the network access node to inform the network access node that the secondary component carrier indicated in the activation command was not activated or was not detected.

In the method of the preceding paragraphs, performed as a result of execution of computer program instructions, stored in a computer-readable memory medium, by at least one data processor of a user equipment.

Figure 5:
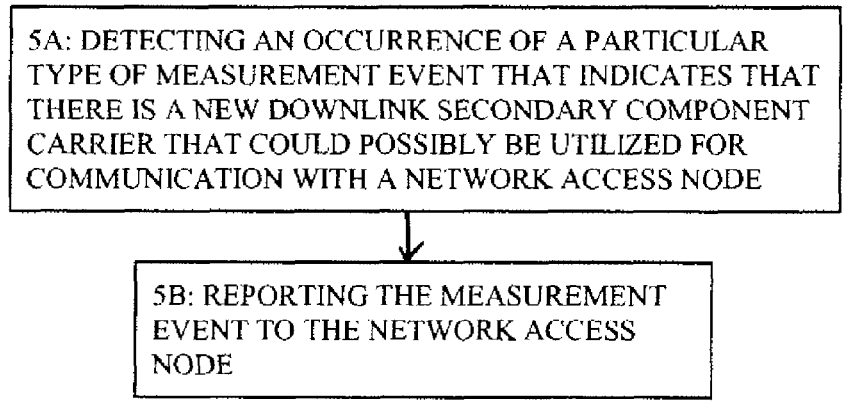

FIG. 5 is a logic flow diagram that illustrates the operation of another method, and a result of execution of computer program instructions, further in accordance with the exemplary embodiments of this invention. In accordance with these exemplary embodiments a method performs, at Block 5A, a step of detecting an occurrence of a particular type of measurement event that indicates that there is a (new) downlink secondary component carrier that could possibly be utilized for communication with a network access node. At Block 5B there is a step of reporting the measurement event to the network access node.

The method of the preceding paragraph, where the particular type of measurement event is one of 'serving becomes better than threshold', measurement event A1; or 'neighbour becomes better than threshold', measurement event A4.

The method as in the preceding paragraph, where for the case of measurement event A4 for a downlink secondary component carrier that the network access node has (at least once) previously attempted to activate, but for which the UE 10 requirements are according to a de-activated SCC, the requirements for the secondary component carrier autonomously follow the requirements of an activated secondary component carrier.

The method of the preceding paragraphs, where the downlink secondary component carrier is out of a coverage area and where a measurement is made according to a de-activated secondary component carrier, and comprising inhibiting the sending of a channel quality indicator report to the network access node, or sending a predetermined channel quality indicator report that indicates a low or zero channel quality.

The method of the preceding paragraph, where measurement requirements according to the de-activated downlink secondary component carrier are based at least in part on whether channel quality indicator resources have been assigned to the specific downlink component carrier by the network access node, and where a presence of assigned channel quality indicator resources is considered as a indication as to whether to wait for the network access node to send an activation command to begin sending channel quality indicator reports, or to autonomously begin sending channel quality indicator reports.

In the method of the preceding paragraphs, further comprising sending a report requested by the network access node, the report containing information of which downlink secondary component carriers, if any, that are measurable.

In the method of the preceding paragraphs, where the network access node is constrained to only activate secondary component carriers that are detectable by the user equipment.

In the method of the preceding paragraphs, performed as a result of execution of computer program instructions, stored in a computer-readable memory medium, by at least one data processor of a user equipment.

Figure 6:
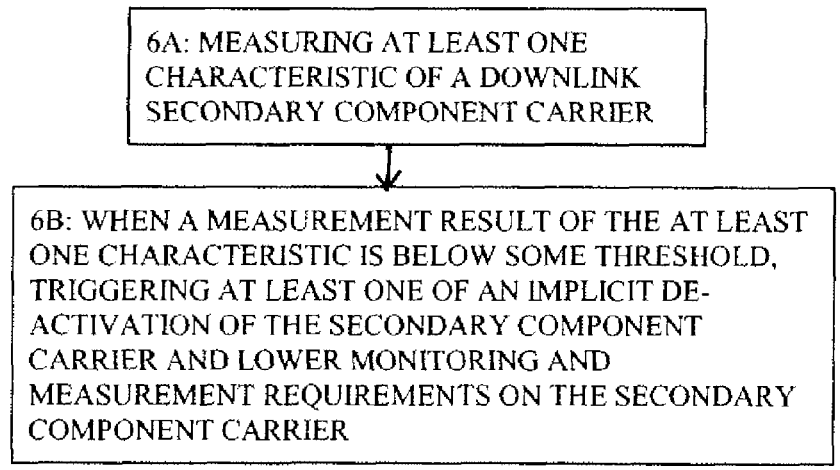

FIG. 6 is a logic flow diagram that illustrates the operation of a method, and a result of execution of computer program instructions, further in accordance with the exemplary embodiments of this invention. In accordance with these exemplary embodiments a method performs, at Block 6A, a step of measuring at least one characteristic of a downlink secondary component carrier. At Block 6B there is a step performed, when a measurement result of the at least one characteristic is below some threshold, of triggering at least one of an implicit de-activation of the secondary component carrier and lower monitoring and measurement requirements on the secondary component carrier (e.g., if the secondary component carrier is activated by not actively monitoring, for example, a PDCCH).

In the method of the preceding paragraph, where triggering the implicit de-activation of the secondary component carrier comprises inhibiting a channel quality indicator measurement of the secondary component carrier and/or not monitoring a PDCCH.

In the method of the preceding paragraphs, where triggering the implicit de-activation of the secondary component carrier comprises inhibiting the sending of a channel quality indicator report to the network access node, or sending a predetermined channel quality indicator report that indicates a low or zero channel quality.

In the method of the preceding paragraphs, where the measurement comprises a received signal strength measurement.

In the method of the preceding paragraphs, where the measured at least one characteristic of the downlink secondary component carrier comprises at least one of signal strength, signal quality and signal power.

In the method of the preceding paragraphs, performed as a result of execution of computer program instructions, stored in a computer-readable memory medium, by at least one data processor of a user equipment.

The various blocks shown in FIGS. 4, 5 and 6 and may be viewed as method steps, and/or as operations that result from operation of computer program code, and/or as a plurality of coupled logic circuit elements constructed to carry out the associated function(s).

The exemplary embodiments also provide an apparatus that comprises a processor and a memory including computer program code, where the memory and computer program code are configured to, with the processor, cause the apparatus at least to perform measuring at least one characteristic of a downlink secondary component carrier and, when a measurement result of the at least one characteristic is below some threshold, considering the downlink secondary component carrier as being undetectable in the event an activation command for a secondary component carrier is received from a network access node.

The exemplary embodiments also provide an apparatus that comprises means for measuring at least one characteristic of a downlink secondary component carrier and means, responsive to a measurement result of the at least one characteristic being below some threshold, for considering the downlink secondary component carrier as being undetectable in the event an activation command for a secondary component carrier is received from a network access node.

The exemplary embodiments also provide an apparatus that comprises a processor and a memory including computer program code, where the memory and computer program code are configured to, with the processor, cause the apparatus at least to perform detecting an occurrence of a particular type of measurement event that indicates that there is a (new) downlink secondary component carrier that could possibly be utilized for communication with a network access node, and reporting the measurement event to the network access node.

The exemplary embodiments also provide an apparatus that comprises means for detecting an occurrence of a particular type of measurement event that indicates that there is a new downlink secondary component carrier that could possibly be utilized for communication with a network access node, and means for reporting the measurement event to the network access node.

The exemplary embodiments also provide an apparatus that comprises a processor and a memory including computer program code, where the memory and computer program code are configured to, with the processor, cause the apparatus at least to perform measuring at least one characteristic of a downlink secondary component carrier and, when a measurement result of the at least one characteristic is below some threshold, triggering an implicit de-activation of the secondary component carrier.

The exemplary embodiments also provide an apparatus that comprises means for measuring at least one characteristic of a downlink secondary component carrier and means, responsive to a measurement result of the at least one characteristic being below some threshold, for triggering an implicit de-activation of the secondary component carrier.

Below are provided further descriptions of various non-limiting, exemplary embodiments. The below-described exemplary embodiments are separately numbered for clarity and identification. This numbering should not be construed as wholly separating the below descriptions since various aspects of one or more exemplary embodiments may be practiced in conjunction with one or more other aspects or exemplary embodiments. That is, the exemplary embodiments of the invention, such as those described immediately below, may be implemented, practiced or utilized in any combination (e.g., any combination that is suitable, practicable and/or feasible) and are not limited only to those combinations described herein and/or included in the appended claims.

Figure 7:
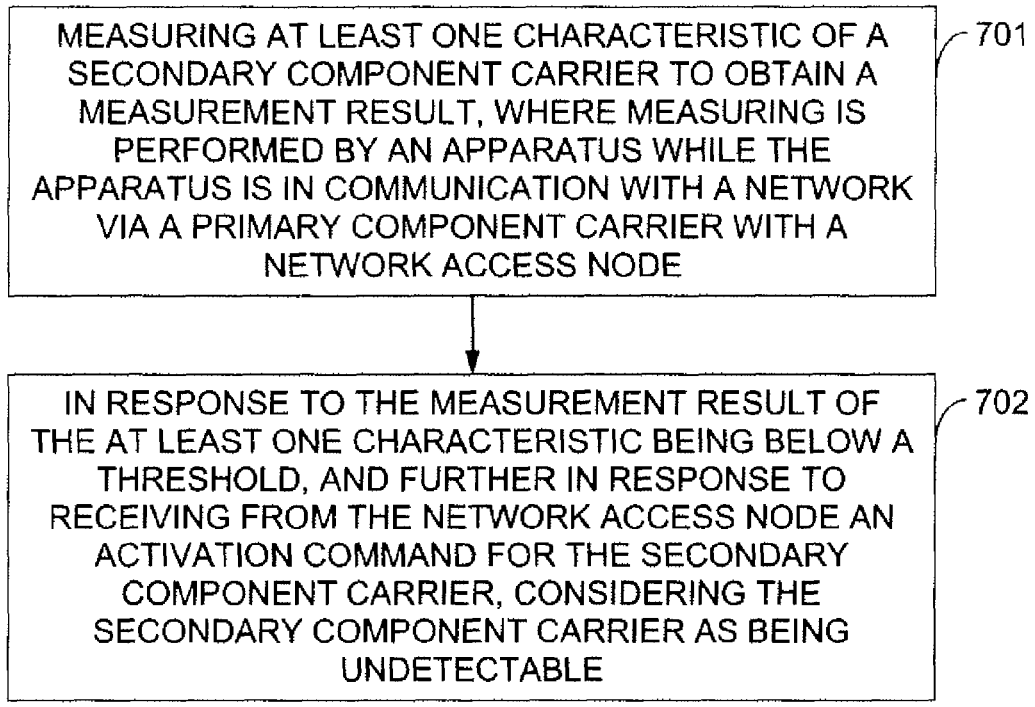
FIGS. 7, 8 and 9 each depict a flowchart illustrating one non-limiting example of a method, and/or a result of execution of computer program instructions embodied on a computer readable memory, for practicing the exemplary embodiments of this invention.

(1) In one exemplary embodiment, and with reference to FIG. 7, a method comprising: measuring at least one characteristic of a secondary component carrier to obtain a measurement result, where measuring is performed by an apparatus while the apparatus is in communication with a network via a primary component carrier with a network access node (701); and in response to the measurement result of the at least one characteristic being below a threshold, and further in response to receiving from the network access node an activation command for the secondary component carrier, considering the secondary component carrier as being undetectable (702).

A method as above, where the primary component carrier and the secondary component carrier are suitable for use by the apparatus in conjunction with carrier aggregation. A method as in any above, where considering the secondary component carrier as undetectable comprises considering the secondary component carrier as being de-activated. A method as in any above, where considering the secondary component carrier as undetectable comprises implicitly considering the secondary component carrier as being de-activated. A method as in any above, where the second component carrier comprises a second downlink component carrier.

A method as in any above, where considering the secondary component carrier as being undetectable comprises considering the secondary component carrier as being activated but without actively monitoring the second component carrier (e.g., not actively monitoring the PDCCH). A method as in any above, where considering the secondary component carrier as being undetectable comprises considering the secondary component carrier as being de-activated. A method as in any above, where considering the secondary component carrier as being de-activated comprises inhibiting a channel quality indicator measurement of the secondary component carrier. A method as in any above, where considering the secondary component carrier as being de-activated comprises inhibiting the sending of a channel quality indicator report to the network access node, or sending a predetermined channel quality indicator report that indicates a low or zero channel quality.

A method as in any above, where considering the secondary component carrier as being undetectable comprises inhibiting a channel quality indicator measurement of the secondary component carrier. A method as in any above, where considering the secondary component carrier as being undetectable comprises inhibiting the sending of a channel quality indicator report to the network access node, or sending a predetermined channel quality indicator report that indicates a low or zero channel quality. A method as in any above, where PDCCH monitoring is not performed (e.g., ignored, skipped). A method as in any above, where the threshold comprises an implicit secondary component carrier de-activation mechanism. A method as in any above, where the threshold serves to lower (e.g., reduce) at least one of the monitoring (e.g., of the PDCCH) and measurement and cell search requirements (e.g., while maintaining the secondary component carrier in an active state).

A method as in any above, where the measured at least one characteristic comprises a received signal strength. A method as in any above, where the measured at least one characteristic comprises at least one of signal strength, signal quality and signal power. A method as in any above, further comprising: in response to receiving a secondary component carrier activation command from the network access node, considering the activation command as a network error. A method as in any above, further comprising: in response to receiving a secondary component carrier activation command from the network access node, signaling an indication (e.g., an occurrence of an activation error, an indication that scheduling is not possible (e.g., due to non-detection of the SCC)) to the network access node to inform the network access node that the secondary component carrier indicated in the activation command was not activated or was not detected. A method as in any above, performed as a result of execution of computer program instructions, stored in a computer-readable memory medium, by at least one data processor of a user equipment.

A method as in any above, implemented as a computer program. A method as in any above, implemented as a computer program stored (e.g., tangibly embodied) on a computer-readable medium (e.g., a program storage device, a memory). A computer program comprising computer program instructions that, when loaded in a processor, perform operations according to one or more (e.g., any one) of the above-described methods. A method as in any above, implemented as a program of instructions tangibly embodied on a program storage device, execution of the program of instructions by a machine (e.g., a processor or a data processor) resulting in operations comprising the steps of the method. A method as in any above, further comprising one or more aspects of the exemplary embodiments of the invention as described herein.

(2) In another exemplary embodiment, a program storage device readable by a machine, tangibly embodying a program of instructions executable by the machine for performing operations, said operations comprising: measuring at least one characteristic of a secondary component carrier to obtain a measurement result, where measuring is performed by an apparatus while the apparatus is in communication with a network via a primary component carrier with a network access node (701); and in response to the measurement result of the at least one characteristic being below a threshold, and further in response to receiving from the network access node an activation command for the secondary component carrier, considering the secondary component carrier as being undetectable (702).

A program storage device as in any above, wherein the program storage device comprises a computer-readable medium, a computer-readable memory, a memory, a memory card, a removable memory, a storage device, a storage component and/or a storage circuit. A program storage device as in any above, further comprising one or more aspects of the exemplary embodiments of the invention as described herein.

(3) In a further exemplary embodiment, an apparatus comprising: at least one processor; and at least one memory including computer program code, the at least one memory and the computer program code being configured to, with the at least one processor, cause the apparatus at least to perform: measuring at least one characteristic of a secondary component carrier to obtain a measurement result, where measuring is performed by an apparatus while the apparatus is in communication with a network via a primary component carrier with a network access node; and in response to the measurement result of the at least one characteristic being below a threshold, and further in response to receiving from the network access node an activation command for the secondary component carrier, considering the secondary component carrier as being undetectable.

An apparatus as in any above, where the apparatus comprises a mobile phone, a mobile node, a cellular phone, a mobile device or a user equipment. An apparatus as in any above, further comprising one or more aspects of the exemplary embodiments of the invention as described herein.

(4) In another exemplary embodiment, an apparatus comprising: means for measuring at least one characteristic of a secondary component carrier to obtain a measurement result, where measuring is performed by an apparatus while the apparatus is in communication with a network via a primary component carrier with a network access node; and means for, in response to the measurement result of the at least one characteristic being below a threshold, and further in response to receiving from the network access node an activation command for the secondary component carrier, considering the secondary component carrier as being undetectable.

An apparatus as in any above, where the means for measuring comprises a measurement unit or a measurement function implemented by a processor and where the means for considering comprises a processor. An apparatus as in any above, where the apparatus comprises a mobile phone, a mobile node, a cellular phone, a mobile device or a user equipment. An apparatus as in any above, further comprising one or more aspects of the exemplary embodiments of the invention as described herein.

(5) In a further exemplary embodiment, an apparatus comprising: measurement circuitry configured to measure at least one characteristic of a secondary component carrier to obtain a measurement result, where measuring is performed by an apparatus while the apparatus is in communication with a network via a primary component carrier with a network access node; and processing circuitry configured, in response to the measurement result of the at least one characteristic being below a threshold, and further in response to receiving from the network access node an activation command for the secondary component carrier, to consider the secondary component carrier as being undetectable.

An apparatus as in any above, embodied on at least one integrated circuit. An apparatus as in any above, where the apparatus comprises a mobile phone, a mobile node, a cellular phone, a mobile device or a user equipment. An apparatus as in any above, further comprising one or more aspects of the exemplary embodiments of the invention as described herein.

Figure 8:
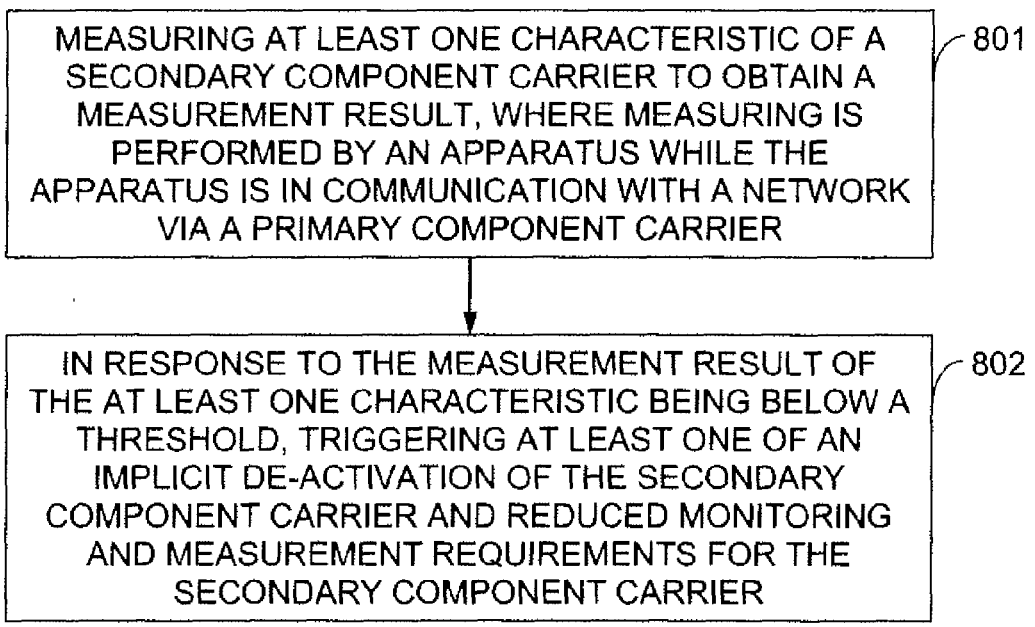

(6) In another exemplary embodiment, and with reference to FIG. 8, a method comprising: measuring at least one characteristic of a secondary component carrier to obtain a measurement result, where measuring is performed by an apparatus while the apparatus is in communication with a network via a primary component carrier (801); and in response to the measurement result of the at least one characteristic being below a threshold, triggering at least one of an implicit de-activation of the secondary component carrier and reduced monitoring and measurement requirements for the secondary component carrier (802).

A method as above, where the primary component carrier and the secondary component carrier are suitable for use by the apparatus in conjunction with carrier aggregation. A method as in any above, where triggering is performed further in response to the secondary component carrier being activated and the apparatus not actively monitoring a PDCCH for the secondary component carrier. A method as in any above, where triggering the implicit de-activation of the secondary component carrier comprises at least one of inhibiting a channel quality indicator measurement of the secondary component carrier and not monitoring a PDCCH. A method as in any above, where triggering the implicit de-activation of the secondary component carrier comprises inhibiting the sending of a channel quality indicator report to the network access node, or sending a predetermined channel quality indicator report that indicates a low or zero channel quality.

A method as in any above, where the measured at least one characteristic comprises a received signal strength. A method as in any above, where the measured at least one characteristic comprises at least one of signal strength, signal quality and signal power. A method as in any above, performed as a result of execution of computer program instructions, stored in a computer-readable memory medium, by at least one data processor of a user equipment.

A method as in any above, implemented as a computer program. A method as in any above, implemented as a computer program stored (e.g., tangibly embodied) on a computer-readable medium (e.g., a program storage device, a memory). A computer program comprising computer program instructions that, when loaded in a processor, perform operations according to one or more (e.g., any one) of the above-described methods. A method as in any above, implemented as a program of instructions tangibly embodied on a program storage device, execution of the program of instructions by a machine (e.g., a processor or a data processor) resulting in operations comprising the steps of the method. A method as in any above, further comprising one or more aspects of the exemplary embodiments of the invention as described herein.

(7) In another exemplary embodiment, a program storage device readable by a machine, tangibly embodying a program of instructions executable by the machine for performing operations, said operations comprising: measuring at least one characteristic of a secondary component carrier to obtain a measurement result, where measuring is performed by an apparatus while the apparatus is in communication with a network via a primary component carrier (801); and in response to the measurement result of the at least one characteristic being below a threshold, triggering at least one of an implicit de-activation of the secondary component carrier and reduced monitoring and measurement requirements for the secondary component carrier (802).

A program storage device as in any above, wherein the program storage device comprises a computer-readable medium, a computer-readable memory, a memory, a memory card, a removable memory, a storage device, a storage component and/or a storage circuit. A program storage device as in any above, further comprising one or more aspects of the exemplary embodiments of the invention as described herein.

(8) In a further exemplary embodiment, an apparatus comprising: at least one processor; and at least one memory including computer program code, the at least one memory and the computer program code being configured to, with the at least one processor, cause the apparatus at least to perform: measuring at least one characteristic of a secondary component carrier to obtain a measurement result, where measuring is performed by an apparatus while the apparatus is in communication with a network via a primary component carrier; and in response to the measurement result of the at least one characteristic being below a threshold, triggering at least one of an implicit de-activation of the secondary component carrier and reduced monitoring and measurement requirements for the secondary component carrier.

An apparatus as in any above, where the apparatus comprises a mobile phone, a mobile node, a cellular phone, a mobile device or a user equipment. An apparatus as in any above, further comprising one or more aspects of the exemplary embodiments of the invention as described herein.

(9) In another exemplary embodiment, an apparatus comprising: means for measuring at least one characteristic of a secondary component carrier to obtain a measurement result, where measuring is performed by an apparatus while the apparatus is in communication with a network via a primary component carrier; and means for, in response to the measurement result of the at least one characteristic being below a threshold, triggering at least one of an implicit de-activation of the secondary component carrier and reduced monitoring and measurement requirements for the secondary component carrier.

An apparatus as in any above, where the means for measuring comprises a measurement unit or a measurement function implemented by a processor and where the means for triggering comprises a processor. An apparatus as in any above, where the apparatus comprises a mobile phone, a mobile node, a cellular phone, a mobile device or a user equipment. An apparatus as in any above, further comprising one or more aspects of the exemplary embodiments of the invention as described herein.

(10) In a further exemplary embodiment, an apparatus comprising: measurement circuitry configured to measure at least one characteristic of a secondary component carrier to obtain a measurement result, where measuring is performed by an apparatus while the apparatus is in communication with a network via a primary component carrier; and processing circuitry configured, in response to the measurement result of the at least one characteristic being below a threshold, to trigger at least one of an implicit de-activation of the secondary component carrier and reduced monitoring and measurement requirements for the secondary component carrier.

An apparatus as in any above, embodied on at least one integrated circuit. An apparatus as in any above, where the apparatus comprises a mobile phone, a mobile node, a cellular phone, a mobile device or a user equipment. An apparatus as in any above, further comprising one or more aspects of the exemplary embodiments of the invention as described herein.

Figure 9:
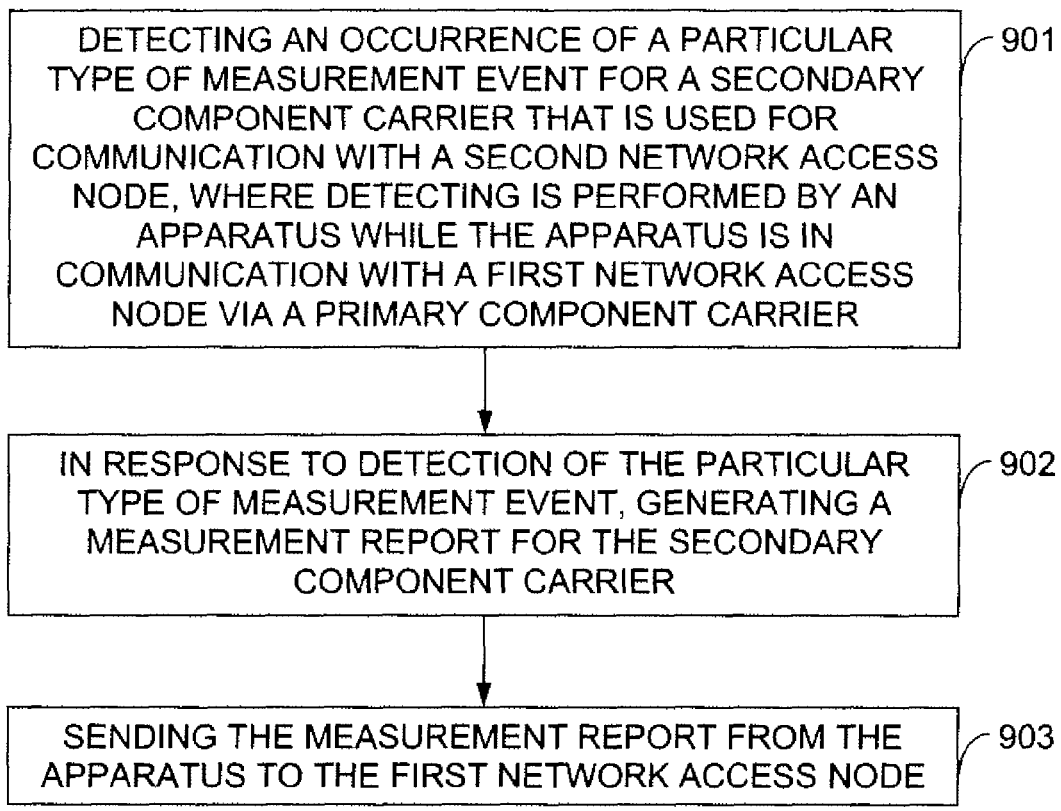

(11) In another exemplary embodiment, and with reference to FIG. 9, a method comprising: detecting an occurrence of a particular type of measurement event for a secondary component carrier that is used for communication with a second network access node, where detecting is performed by an apparatus while the apparatus is in communication with a first network access node via a primary component carrier (901); in response to detection of the particular type of measurement event, generating a measurement report for the secondary component carrier (902); and sending the measurement report from the apparatus to the first network access node (903).

A method as above, where the primary component carrier and the secondary component carrier are suitable for use by the apparatus in conjunction with carrier aggregation. A method as in any above, where the particular type of measurement event indicates that the secondary component carrier is one of available or unavailable for use for communication with a second network access node. A method as in any above, where the particular type of measurement event comprises at least one of event A1 'Serving becomes better than threshold', event A2 'Serving becomes worse than threshold' and event A4 'neighbour becomes better than threshold'. A method as in any above, in response to the particular type of measurement event comprising event A4 'neighbour becomes better than threshold', the network access node having previously attempted to activate the secondary component carrier and apparatus requirements being according to a de-activated secondary component carrier, having the apparatus requirements for the secondary component carrier autonomously follow requirements of an activated secondary component carrier.

A method as in any above, where for the case of measurement event A4 for a downlink secondary component carrier that the network access node has (at least once) previously attempted to activate, but for which the UE 10 requirements are according to a de-activated SCC, the requirements for the secondary component carrier autonomously follow the requirements of an activated secondary component carrier. A method as in any above, where the secondary component carrier is out of a coverage area and where a measurement is made according to a de-activated secondary component carrier, the method further comprising: inhibiting sending of a channel quality indicator report to the network access node, or sending a predetermined channel quality indicator report that indicates a low or zero channel quality.

A method as in any above, where the secondary component carrier comprises a de-activated secondary component carrier, where measurement requirements for the de-activated secondary component carrier are at least in part based on whether channel quality indicator resources have been assigned to the de-activated secondary component carrier by the network access node, and where a presence of assigned channel quality indicator resources is considered as an indication whether to wait for the network access node to send an activation command to begin sending channel quality indicator reports for the secondary component carrier, or to autonomously begin sending channel quality indicator reports. A method as in any above, further comprising sending a report requested by the network access node, the report containing information of which secondary component carriers are measurable. A method as in any above, where the network access node is constrained to only activate secondary component carriers that are detectable by the user equipment. A method as in any above, performed as a result of execution of computer program instructions, stored in a computer-readable memory medium, by at least one data processor of a user equipment.

A method as in any above, implemented as a computer program. A method as in any above, implemented as a computer program stored (e.g., tangibly embodied) on a computer-readable medium (e.g., a program storage device, a memory). A computer program comprising computer program instructions that, when loaded in a processor, perform operations according to one or more (e.g., any one) of the above-described methods. A method as in any above, implemented as a program of instructions tangibly embodied on a program storage device, execution of the program of instructions by a machine (e.g., a processor or a data processor) resulting in operations comprising the steps of the method. A method as in any above, further comprising one or more aspects of the exemplary embodiments of the invention as described herein.

(12) In another exemplary embodiment, a program storage device readable by a machine, tangibly embodying a program of instructions executable by the machine for performing operations, said operations comprising: detecting an occurrence of a particular type of measurement event for a secondary component carrier that is used for communication with a second network access node, where detecting is performed by an apparatus while the apparatus is in communication with a first network access node via a primary component carrier (901); in response to detection of the particular type of measurement event, generating a measurement report for the secondary component carrier (902); and sending the measurement report from the apparatus to the first network access node (903).

A program storage device as in any above, wherein the program storage device comprises a computer-readable medium, a computer-readable memory, a memory, a memory card, a removable memory, a storage device, a storage component and/or a storage circuit. A program storage device as in any above, further comprising one or more aspects of the exemplary embodiments of the invention as described herein.

(13) In a further exemplary embodiment, an apparatus comprising: at least one processor; and at least one memory including computer program code, the at least one memory and the computer program code being configured to, with the at least one processor, cause the apparatus at least to perform: detecting an occurrence of a particular type of measurement event for a secondary component carrier that is used for communication with a second network access node, where detecting is performed by an apparatus while the apparatus is in communication with a first network access node via a primary component carrier; in response to detection of the particular type of measurement event, generating a measurement report for the secondary component carrier; and sending the measurement report from the apparatus to the first network access node.

An apparatus as in any above, where the apparatus comprises a mobile phone, a mobile node, a cellular phone, a mobile device or a user equipment. An apparatus as in any above, further comprising one or more aspects of the exemplary embodiments of the invention as described herein.

(14) In another exemplary embodiment, an apparatus comprising: means for detecting an occurrence of a particular type of measurement event for a secondary component carrier that is used for communication with a second network access node, where detecting is performed by an apparatus while the apparatus is in communication with a first network access node via a primary component carrier; means for, in response to detection of the particular type of measurement event, generating a measurement report for the secondary component carrier; and means for sending the measurement report from the apparatus to the first network access node.

An apparatus as in any above, where the means for detecting and the means for generating comprise at least one processor and where the means for sending comprises a transmitter. An apparatus as in any above, where the apparatus comprises a mobile phone, a mobile node, a cellular phone, a mobile device or a user equipment. An apparatus as in any above, further comprising one or more aspects of the exemplary embodiments of the invention as described herein.

(15) In a further exemplary embodiment, an apparatus comprising: detection circuitry configured to detect an occurrence of a particular type of measurement event for a secondary component carrier that is used for communication with a second network access node, where detecting is performed by an apparatus while the apparatus is in communication with a first network access node via a primary component carrier; report generation circuitry configured, in response to detection of the particular type of measurement event, to generate a measurement report for the secondary component carrier; and transmission circuitry configured to send the measurement report from the apparatus to the first network access node.

An apparatus as in any above, embodied on at least one integrated circuit. An apparatus as in any above, where the apparatus comprises a mobile phone, a mobile node, a cellular phone, a mobile device or a user equipment. An apparatus as in any above, further comprising one or more aspects of the exemplary embodiments of the invention as described herein.

The exemplary embodiments of the invention, as discussed above and as particularly described with respect to exemplary methods, may be implemented as a computer program product comprising program instructions embodied on a tangible computer-readable medium. Execution of the program instructions results in operations comprising steps of utilizing the exemplary embodiments or steps of the method.

The exemplary embodiments of the invention, as discussed above and as particularly described with respect to exemplary methods, may be implemented in conjunction with a program storage device (e.g., a computer-readable medium, a memory) readable by a machine (e.g., a computer, a mobile station, a mobile device, a mobile node), tangibly embodying a program of instructions (e.g., a program, a computer program) executable by the machine for performing operations. The operations comprise steps of utilizing the exemplary embodiments or steps of the method.

The various blocks shown in FIGS. 4-9 may be viewed as method steps, as operations that result from operation of computer program code and/or as one or more coupled components (e.g., function blocks, circuits, integrated circuits, logic circuit elements) constructed to carry out the associated function(s). The blocks depicted in FIGS. 4-9 may also be considered to correspond to one or more functions and/or operations that are performed by one or more components, apparatus, processors, computer programs, circuits, integrated circuits, application-specific integrated circuits (ASICs), chips and/or function blocks. Any and/or all of the above may be implemented in any practicable arrangement or solution that enables operation in accordance with the exemplary embodiments of the invention.

Furthermore, the arrangement of the blocks shown in FIGS. 4-9 should be considered merely exemplary and non-limiting. It should be appreciated that the blocks depicted in FIGS. 4-9 may correspond to one or more functions and/or operations that may be performed in any order (e.g., any practicable, suitable and/or feasible order) and/or concurrently (e.g., as practicable, suitable and/or feasible) so as to implement one or more of the exemplary embodiments of the invention. In addition, one or more additional steps, functions and/or operations may be utilized in conjunction with those illustrated in FIGS. 4-9 so as to implement one or more further exemplary embodiments of the invention, such as those described in further detail herein.

That is, the non-limiting, exemplary embodiments of the invention shown in FIGS. 4-9 may be implemented, practiced or utilized in conjunction with one or more further aspects in any combination (e.g., any combination that is practicable, suitable and/or feasible) and are not limited only to the blocks, steps, functions and/or operations illustrated in FIGS. 4-9.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein, two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical region (both visible and invisible), as several non-limiting and non-exhaustive examples.

While the exemplary embodiments have been described above in the context of the E-UTRA (UTRAN-LTE) system, it should be appreciated that the exemplary embodiments of this invention are not limited for use with only this one particular type of wireless communication system, and that they may be used to advantage in other wireless communication systems.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controllers, other computing devices and/or some combination thereof.

The exemplary embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

As such, it should be appreciated that at least some aspects of the exemplary embodiments of the inventions may be practiced in various components such as integrated circuit chips and modules. It should thus be appreciated that the exemplary embodiments of this invention may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this invention.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of the non-limiting and exemplary embodiments of this invention.

Furthermore, some of the features of the preferred embodiments of this invention could be used to advantage without the corresponding use of other features. As such, the foregoing description should be considered as merely illustrative of the principles, teachings and exemplary embodiments of this invention, and not in limitation thereof.

What is claimed is:

1. A method, comprising:
   measuring at least one characteristic of a secondary component carrier to obtain a measurement result, wherein the measuring is performed by an apparatus while the apparatus is in communication with a network via a primary component carrier with a network access node; and
   in response to the measurement result of the at least one characteristic being below a threshold, and further in response to receiving from the network access node an activation command for the secondary component carrier, considering the secondary component carrier as being undetectable.

2. The method as claimed in claim 1, wherein the primary component carrier and the secondary component carrier are suitable for use by the apparatus in conjunction with carrier aggregation.

3. The method as claimed in claim 1, wherein the considering the secondary component carrier as undetectable comprises considering the secondary component carrier as being de-activated.

4. The method as claimed in claim 1, wherein the method is performed as a result of execution of computer program instructions, stored in a computer-readable memory medium, by at least one data processor of a user equipment.

5. An apparatus, comprising: at least one processor; and
   at least one memory including computer program code,
   the at least one memory and the computer program code configured to, with the at least one processor, cause the apparatus to, at least:
   measure at least one characteristic of a secondary component carrier to obtain a measurement result, wherein the measuring is performed by an apparatus while the apparatus is in communication with a network via a primary component carrier with a network access node; and in response to the measurement result of the at least one characteristic being below a threshold, and further in response to receiving from the network access node an activation command for the secondary component carrier, consider the secondary component carrier as being undetectable.

6. The apparatus as claimed in claim 5, wherein the primary component carrier and the secondary component carrier are suitable for use by the apparatus in conjunction with carrier aggregation.

7. The apparatus as claimed in claim 5, where the considering the secondary component carrier as undetectable comprises considering the secondary component carrier as being de-activated.

8. The apparatus as claimed in claim 5, where the considering the secondary component carrier as being undetectable comprises considering the secondary component carrier as being activated but without actively monitoring the second component carrier.

9. The apparatus as claimed in claim 5, where the considering the secondary component carrier as being undetectable comprises inhibiting a channel quality indicator measurement of the secondary component carrier.

10. The apparatus as claimed in claim 5, where the considering the secondary component carrier as being undetectable comprises inhibiting sending of a channel quality indicator report to the network access node, or sending a predetermined channel quality indicator report that indicates a low or zero channel quality.

11. The apparatus as claimed in claim 5, where the measured at least one characteristic comprises at least one of signal strength, received signal strength, signal quality and signal power.

12. The apparatus as claimed in claim 5, wherein the at least one processor and the at least one memory are further configured to cause the apparatus,
in response to receiving a secondary component carrier activation command from the network access node, to consider the activation command as a network error.

13. The apparatus as claimed in claim 5, wherein the at least one processor and the at least one memory are further configured to cause the apparatus,
in response to receiving a secondary component carrier activation command from the network access node, signal an indication to the network access node to inform the network access node that the secondary component carrier indicated in the activation command was not activated or was not detected.

14. The apparatus as claimed in claim 5, where the apparatus comprises a mobile phone or a user equipment.

15. A method, comprising:
measuring at least one characteristic of a secondary component carrier to obtain a measurement result, wherein the measuring is performed by an apparatus while the apparatus is in communication with a network via a primary component carrier; and
in response to the measurement result of the at least one characteristic being below a threshold, triggering at least one of an implicit de-activation of the secondary component carrier and reduced monitoring and measurement requirements for the secondary component carrier,
where the triggering the implicit de-activation of the secondary component carrier is further for inhibiting the sending of a channel quality indicator report to a network access node, or sending a predetermined channel quality indicator report that indicates a low or zero channel quality.

16. The method as claimed in claim 15, performed as a result of execution of computer program instructions, stored in a computer-readable memory medium, by at least one data processor of a user equipment.

17. An apparatus comprising:
at least one processor; and
at least one memory including computer program code,
the at least one memory and the computer program code configured to, with the at least one processor, cause the apparatus to perform, at least:
measure at least one characteristic of a secondary component carrier to obtain a measurement result, wherein the measuring is performed by the apparatus while the apparatus is in communication with a network via a primary component carrier; and
in response to the measurement result of the at least one characteristic being below a threshold, trigger at least one of an implicit de-activation of the secondary component carrier and reduced monitoring and measurement requirements for the secondary component carrier,
where the triggering the implicit de-activation of the secondary component carrier is further for inhibiting the sending of a channel quality indicator report to a network access node, or sending a predetermined channel quality indicator report that indicates a low or zero channel quality.

18. The apparatus as claimed in claim 17, where the primary component carrier and the secondary component carrier are suitable for use by the apparatus in conjunction with carrier aggregation.

19. The apparatus as claimed in claim 17, where the triggering is performed further in response to the secondary component carrier being activated and the apparatus not actively monitoring a PDCCH for the secondary component carrier.

* * * * *